(12) United States Patent
Kelly

(10) Patent No.: US 6,275,586 B1
(45) Date of Patent: Aug. 14, 2001

(54) CRYPTOGRAPHICALLY SECURE PSEUDO RANDOM NUMBER GENERATOR

(75) Inventor: John R. Kelly, San Jose, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/151,167

(22) Filed: Sep. 10, 1998

(51) Int. Cl.[7] .................................................. G06F 1/02
(52) U.S. Cl. ............................ 380/46; 380/44; 380/47; 708/250; 708/251; 708/252
(58) Field of Search .............................. 380/268, 28, 47, 380/46, 44; 708/250, 251, 252

(56) References Cited

U.S. PATENT DOCUMENTS

| | | | |
|---|---|---|---|
| 4,694,412 | * | 9/1987 | Domenik et al. ................ 364/717 |
| 5,440,640 | * | 8/1995 | Anshel et al. .................... 380/46 |
| 5,452,358 | * | 9/1995 | Normile et al. .................. 380/42 |
| 5,760,700 | * | 6/1998 | Ellis ................................ 340/825.3 |
| 6,105,012 | * | 8/2000 | Chang et al. .................... 705/64 |

* cited by examiner

Primary Examiner—Thomas R. Peeso
Assistant Examiner—Todd Jack
(74) Attorney, Agent, or Firm—Marshall, O'Toole, Gerstein, Murray & Borun

(57) ABSTRACT

A cryptographically secure random number generating system includes a random number generator for generating random numbers, an encryption engine, and a modulus offset unit. The random number generator has a valid output set consisting of M−1 random numbers, and an invalid output set including one invalid output value. The encryption engine is responsive to the random number and to the invalid output value, and operative to encrypt the random number to provide an encrypted random number, and further operative to encrypt the invalid output value to provide an encrypted invalid output value. The modulus offset unit includes: a sub-modulo for adding, in modulo M, the invalid output value to the encrypted random number to determine a sum; and a sub-modulo for subtracting, in modulo M, the encrypted invalid output value from the sum to determine a cryptographically secure random number.

11 Claims, 5 Drawing Sheets

150 ↘

| | R | R' = E(R) | R" = E(R)-E(X) +X |
|---|---|---|---|
| 153 | 1 | 3 | 5 |
| 153 | 2 | 2 | 4 |
| 153 | 3 | 6 | 1 |
| 153 | 4 | 1 | 3 |
| 153 | 5 | 0 | 2 |
| 153 | 6 | 4 | 6 |

| | X | X' = E(X) | X" = E(X)-E(X) +X |
|---|---|---|---|
| 163 | 0 | 5 | 0 |

CRYPTOGRAPHICALLY SECURE PSEUDO RANDOM NUMBER GENERATOR

FIELD OF THE INVENTION

The present invention relates generally to random number generators. Specifically, the present invention relates to a method and apparatus for improving the cryptographic security of a random number generator without changing essential characteristics of the generator including its invalid output set.

DESCRIPTION OF THE PRIOR ART

Many electronic devices utilize random number generators (RNG's) for implementing random functions. For example, in electronic casino gaming devices for implementing games of chance (e.g., poker, roulette, and slot machines), randomness is critically important to ensure proper game play and payment of winnings. Electronic casino gaming devices typically include game event modules for implementing game events which depend on chance. These event modules normally include an RNG, and an outcome generator which is responsive to the random numbers and operative to implement play of a particular casino type game. The random number generator usually has a valid output set and an invalid output set, and is only capable of generating random numbers of the invalid output set. Therefore, the outcome generator is programmed to be responsive only to numbers of the valid output set of the RNG.

A casino gaming application requires an RNG that is highly unpredictable and cryptographically secure. In addition, an RNG for use in casino gaming applications should have the following characteristics: every possible permutation in the valid output set of random numbers should be obtainable; the probability of a permutation occurring should be the same as the probability of any other permutation occurring; the occurrence of a permutation should not favor or disfavor the occurrence of any other permutation occurring; and should generate random permutations having a large recycling period, defined as the number of output cycles between occurrences of a permutation. Furthermore, it is desirable that the random number generator use minimal hardware and have fast execution speed.

There exist in the prior art a variety of methods for increasing the cryptographic security of random number generators. One method of generating cryptographically secure random numbers includes translating the valid output set of a the generator by encrypting the random numbers of the set using an encryption engine to provide an encrypted output set. However, the translation of the valid output set by the encryption engine can result in an encrypted output set which cannot be directly provided to the outcome generator. Firstly, an element of the encrypted set may be mapped from the invalid output value of the generator in which case the encrypted set will have an element which is non-occurring because the generator does not provide the invalid output value to the encryption engine. Secondly, the encrypted set may have an element which is equal to the invalid output of the generator and which cannot be provided to the outcome generator without re-programming the outcome generator. Such reprogramming is costly and time consuming.

What is needed is a method and apparatus for improving the cryptographic security of a random number generator without varying the valid and invalid output sets of the generator.

What is further needed is such a method and apparatus which achieves the requirements that: every possible permutation in the valid output set of random numbers of the generator is obtainable; the probability of a permutation occurring is the same as the probability of any other permutation occurring; the occurrence of a permutation does not favor or disfavor the occurrence of any other permutation occurring; and the RNG generates random permutations having a large recycling period, which is defined as the number of output cycles between occurrences of a permutation.

SUMMARY OF THE INVENTION

It is therefore an objective of the present invention to provide a method and apparatus for enhancing the cryptographic security of an RNG used in an electronic gaming application wherein the valid and invalid output sets of the generator are not changed so that the outcome generator of the gaming system need not be reprogrammed.

Another objective of the present invention is to provide a cryptographically secure random number generator system wherein every possible permutation occurring in the output of the generator is randomly obtainable.

Further objectives of the present invention are to provide a cryptographically secure RNG system wherein: the probability of each permutation is the same as the probability of any other permutation; the occurrence of one permutation does not favor or disfavor the occurrence of any other permutation; each of the random numbers generated has a large recycling period; only minimal hardware is required; and the execution speed is fast.

Briefly, the present invention provides a cryptographically secure random number generating system including an RNG for generating random numbers, an encryption engine, and a modulus offset unit. The RNG has a valid output set consisting of M−1 random numbers, and an invalid output set including one invalid output value. The encryption engine is responsive to the random number and to the invalid output value, and is operative to encrypt the random number to provide an encrypted random number. The engine is further operative to encrypt the invalid output value to provide an encrypted invalid output value. The modulus offset unit includes: a sub-modulo for adding, in modulo M, the invalid output value to the encrypted random number to determine a sum; and a sub-modulo for subtracting, in modulo M, the encrypted invalid output value from the sum to determine a cryptographically secure random number.

The present invention also provides a process of generating a cryptographically secure stream of random numbers. In the process, the random numbers are received from a generator having a valid output set consisting of M−1 random numbers, and an invalid output set including one invalid output value. The invalid output value is received. The random number is encrypted using an encryption function to provide an encrypted random number. The invalid output value is encrypted using the encryption function to generate an encrypted invalid output value. The invalid output value is added in modulus M to the encrypted random number to determine a sum. The encrypted invalid output value is then subtracted in modulus M from the sum to determine a cryptographically secure random number. A computer readable medium contains program instructions for generating a cryptographically secure random number, the program instructions including instructions for performing the above described process steps.

An advantage of the present invention is that the cryptographic security of a random number generator of an electronic casino gaming application can be enhanced using an encryption engine without varying the invalid output of the RNG.

Another advantage of the present invention is that is provides a method and apparatus for generating random numbers wherein every possible permutation is randomly obtainable. Further advantages of the present invention are that: the probability of each permutation is the same as the probability of any other permutation; the occurrence of one permutation does not favor or disfavor the occurrence of any other permutation; each random number generated has a large recycling period; only minimal hardware is required; and the execution speed is fast.

These and other objects and advantage of the present invention will no doubt become apparent to those of ordinary skill in the art after having read the following detailed description of the preferred embodiments. It is understood that the present invention can be used in a variety of applications and devices, even though the following description pertains to casino game applications.

IN THE DRAWING

FIG. 3A is a table depicting translations of a valid output set of an exemplary random number generator, wherein the translations are performed by an encryption engine and a modulus offset circuit of the present invention to provide a cryptographically secure set of random numbers;

FIG. 3B is a table depicting translations of an invalid output set, corresponding with the valid output set, of the exemplary random number generator, wherein the translations are performed by the encryption engine and modulus offset circuit of the present invention;

DETAILED DESCRIPTION OF THE PREFERRED EMBODIMENT

Figure 1:
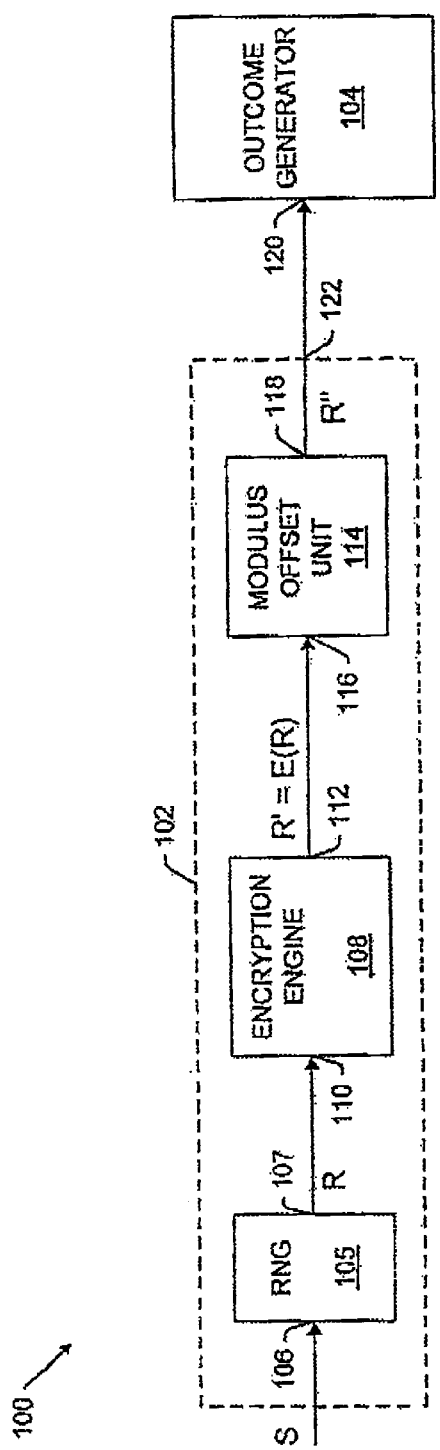
FIG. 1 is a block diagram generally illustrating a game event module of an electronic casino gaming system including a cryptographically secure random number generator system (RNG system) according to the present invention, and a casino game outcome generator, the RNG system including a random number generator, an encryption engine, and a modulus offset unit.

FIG. 1 illustrates at 100 a block diagram of a game event module of the type used in a casino gaming application and includes a cryptographically secure random number generator system 102 according to the present invention, and a casino gaming outcome generator 104. System 102 includes a random number generator 105 having an output 106 for receiving a seed value S, and an output 107 for providing a valid output set R consisting of an integer number M−1, of multi-bit random numbers $[r_1, \ldots r_{M-1}]$; an encryption engine 108 having an input 110 connected to receive the valid output R of random numbers $[r_1, \ldots r_{M-1}]$ from output 107 of generator 105, and an output 112 providing an encrypted set R'=E(R) of encrypted random numbers $[r_1', \ldots$ $r_{M-1}']$, which is equal to $[E(r_1), \ldots E(r_{M-1})]$; and a modulus offset unit 114 having an input 116 connected to receive the encrypted set R' of encrypted random numbers from output 112, and an output 118 providing a set R" of cryptographically secure random numbers $[r_1'', \ldots r_{M-1}'']$ translated from the encrypted set R' according to a process further described below.

Generator 105 may be any appropriate RNG which is suitable for casino gaming application and includes an appropriate stream cipher function generator or block cipher function generator. A block cipher random number generator receives a seed input from and produces an N-bit random output value. In a preferred embodiment of the present invention, generator 105 is of the type described in U.S. patent application Ser. No. 08/665,699, filed on Jun. 18, 1996 and assigned to Silicon Gaming, Inc.

As mentioned above, generator 105 has a valid output set R of random numbers. Generator 105 is also characterized as having an invalid output set X including one invalid output value, x. In the embodiment wherein generator 105 is of a type described in the reference United States Patent Application, the invalid output set includes a value of zero (X=0), which is not provided by generator 105.

Encryption engine 108 may be implemented in hardware or in software using any appropriate encryption function. In an embodiment of the present invention, encryption engine 108 employs an RSA encryption function of the type provided by RSA Data Security Inc. of Redwood City, Calif. It is important to note that in the present invention, the encryption function performed by engine 108 and the RNG function performed by generator 105 do not share a special relationship which would render the output of the encryption engine 108 predictable. Encryption engine 108 performs an encryption function having a "one to one and onto" quality. A function F from a set S to a set T is said to be a one to one mapping function from S onto T if no two elements of S are mapped to the same element of T and if every element of T has some element of S mapped to it. Most encryption functions have this quality which is very useful in the casino gaming industry because each output value should occur exactly once for each set of possible input values.

In the system 102, the encrypted set R' of encrypted random numbers $[r_1', \ldots r_{M-1}']$ provided at output 112 of encryption engine 108 is translated from the valid output set R of random numbers $[r_1, \ldots r_{M-1}]$ of generator 105. No two elements of the valid output set R of random numbers are mapped to the same element of the encrypted set R' of encrypted random numbers, and every element of the encrypted set R' has some element of the valid output set R mapped to it.

The translation by encryption engine 108 of the valid output set R of generator 105 may result in an encrypted set R' of encrypted random numbers which cannot be directly provided to outcome generator 104 without re-programming the outcome generator. First, the encrypted set R' may have an element which is non-occurring if the invalid output value x of generator 105 maps to a value E(x) which is included as an element of the encrypted set R' because generator 105 does not provide the invalid output set X. This situation would violate the requirements that every possible permutation in the valid output set R of random number generator 105 be obtainable, and that the probability of a permutation occurring be the same as the probability of any other permutation occurring. Secondly, the encrypted set R' may have an element which is equal to the invalid output X of generator 105 and which cannot be provided to outcome generator 104 without re-programming the outcome generator.

Because it is very costly and time consuming to reprogram outcome generator 104, it is desirable in system 102 that the modulus offset unit 114 provide a valid output set which does not include an invalid output value x of generator 105. In order to achieve this objective, the modulus offset 114 performs a modulus M arithmetic function on each of the (M−1) encrypted numbers $r_m'$ of the encrypted output set R' to determine the set R" of cryptographically secure random numbers $r_m$" according to modulus M arithmetic relationships (1) and (2), below;

$$R"=R'-E(X)+X \text{ (modulus M)} \quad (1)$$

$$r_m"=r_m'-E(x)+x \text{ (modulus M)} \quad (2)$$

wherein M is equal to the number, M−1, of randomly attainable numbers $[r_1, \ldots r_{M-1}]$ of the valid output set R, plus the number (one in the preferred embodiment) of invalid output values of the invalid output set of random number generator 105. In modulus M arithmetic, the base number is divided by M yielding a remainder which is the output. An important quality of modulus M arithmetic for use in the present application is that the range of input values to a modulus M function is the same as the range of output values of the function. A modulus M arithmetic function performed on a set of elements of the set [0, 1, . . . M−1] never yields a value outside of the range [0, 1, . . . m−1].

Figure 2:
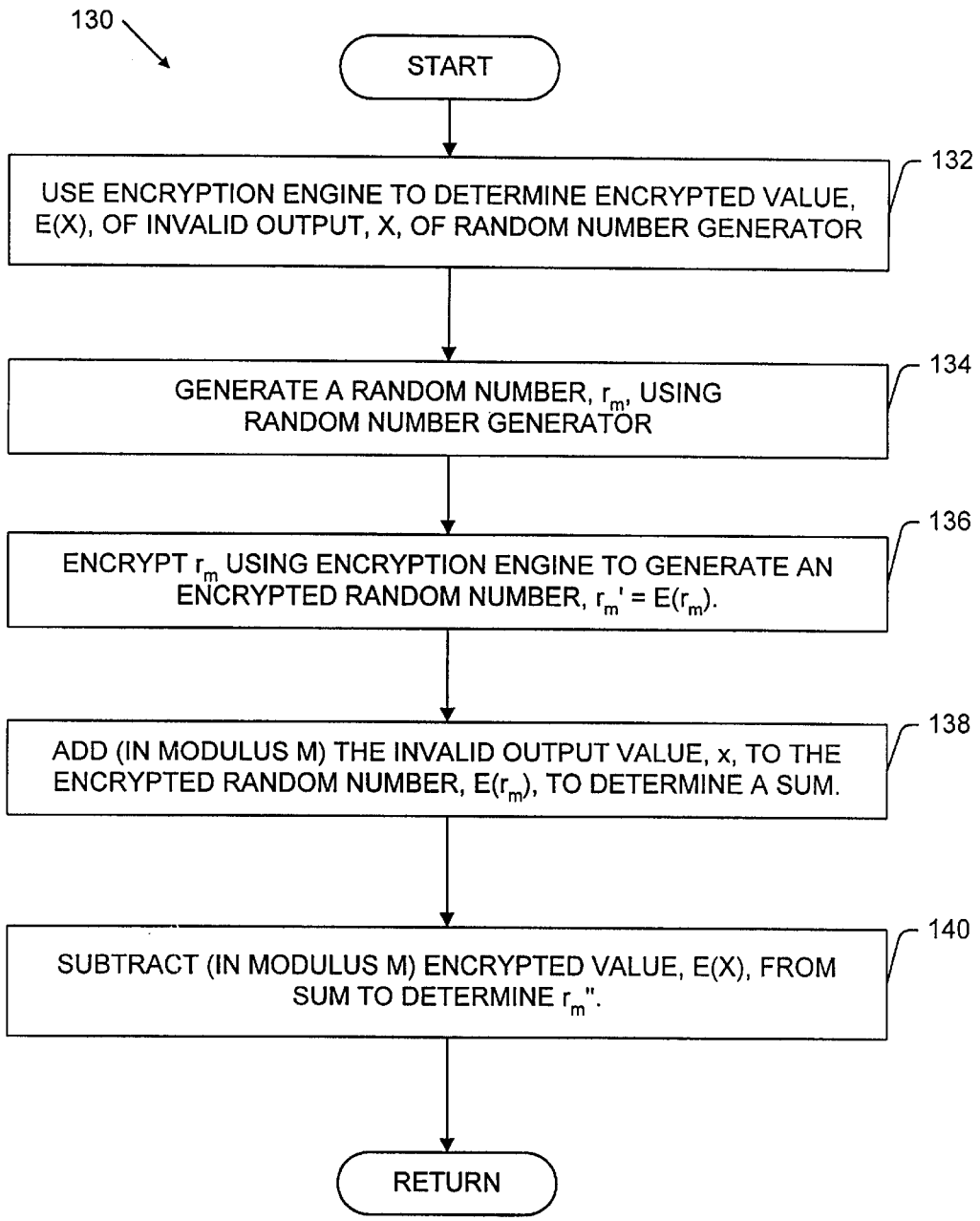
FIG. 2 is a flow diagram illustrating a process according to the present invention for generating unpredictable random numbers using the cryptographically secure RNG system of FIG. 1.

FIG. 2 shows a flow diagram at 130 illustrating a process according to the present invention for generating cryptographically secure random numbers. The process is performed by system 102 (FIG. 1). In step 132, the encryption engine receives and encrypts the invalid output value x of the random number generator to determine an invalid encrypted value E(x). In step 134, the random number generator receives a seed value and generates a random number, $r_m$, of the set R of randomly attainable numbers $[r_1, \ldots r_{M-1}]$. In step 136, the encryption engine encrypts the random number, $r_m$, generated in step 134 to provide an encrypted random number, $r_m'=E(r_m)$. In step 138, the modulus offset unit performs modulus M arithmetic to add the invalid output value x to the encrypted random number, $r_m'=E(r_m)$ to determine a sum. In step 140, the modulus offset unit performs modulus M arithmetic to subtract the invalid encrypted value E(x) from the sum determined in step 138 to determine $r_m$" which is equal to $[E(r_m)-E(x)+x.]$ in accordance with Relationship (2), above.

FIG. 3A shows a table at 150 including: a first column 152 containing an exemplary valid output set R of (M−1=6) randomly attainable numbers $r_m=[1, 2, 3, 4, 5, 6]$, the valid output set R being provided by generator 105 (FIG. 1) using an exemplary random number generating function; a second column 154 containing a set R' of 6 encrypted random numbers $r_m'=E(r_m)=[3, 2, 6, 1, 0, 4]$, wherein the encrypted random numbers are encrypted from the corresponding random numbers $r_m$ of corresponding rows 153 of the first column 152 using an exemplary encryption function; and a third column 156 containing a set R" of six cryptographically secure random numbers $r_m"=[5, 4, 1, 3, 2, 6]$, the set R" being provided at output 118 of the modulus offset unit 114 (FIG. 1) wherein the cryptographically secure random numbers $r_m$" are translated from corresponding encrypted random numbers $r_m'$ of corresponding rows 153 of the second column 154 using the modulus offset unit of FIG. 1, according to relationship (2), above.

FIG. 3B shows a table at 160 including a first column 162 containing an exemplary invalid output set X, including 1 invalid output value x=0; a second column 154 containing a set X'=E(X) of one encrypted invalid random value x'=E(x)=5, encrypted from the corresponding invalid random value x of the corresponding row 163 of the first column 162 using the same exemplary encryption function as used in associated with the table of FIG. 3A; and a third column 166 containing a set X" including one cryptographically secure invalid random value x"=0, which is provided at output 118 of the modulus offset unit 114 (FIG. 1) wherein the cryptographically secure invalid random value x" is translated from the encrypted invalid random value x' of corresponding rows 163 of the second column 164 using the modulus offset unit (FIG. 1), according to relationship (2), above.

In the depicted example, the invalid output value, x=0, maps to the encrypted invalid random value x'=5. Because the encryption function has the "one-to-one and onto" quality, no other input value will be mapped to x'=5. Because the invalid output value, x=0, is not generated by generator 105 (FIG. 1), the value of 5 is non-occurring in the encrypted set R'. Also in the depicted example, the value zero is an element of the encrypted set E(R), and therefore, the encrypted set E(R) cannot be provided to the outcome generator 104 without re-programming the outcome generator 104. However, the translation (from the encrypted random values $r_m'$ and x' to the cryptographically secure invalid random values $r_m$" and x") performed by the modulus offset unit 114 (FIG. 1) provides a set of cryptographically secure invalid random values suitable for the casino gaming outcome generator without a need to reprogram the outcome generator (or proposition engine) of the casino gaming apparatus.

In other embodiments of the present invention, random number generator 105 may be implemented by varying types of random number generators including stream cipher random number generators and block cipher random number generators. Stream cipher function generators produce multi-bit random numbers one random bit value at a time. Therefore, to produce an N bit random number, the stream cipher must be clocked N times and the resulting N bits must be concentrated. The output of a stream cipher depends entirely on the internal state of the cipher. Therefore, the initial state of the stream cipher is established using a secret seed value. If the cipher is ever in the same state twice, then it will produce the same sequence of bits.

Figure 4:
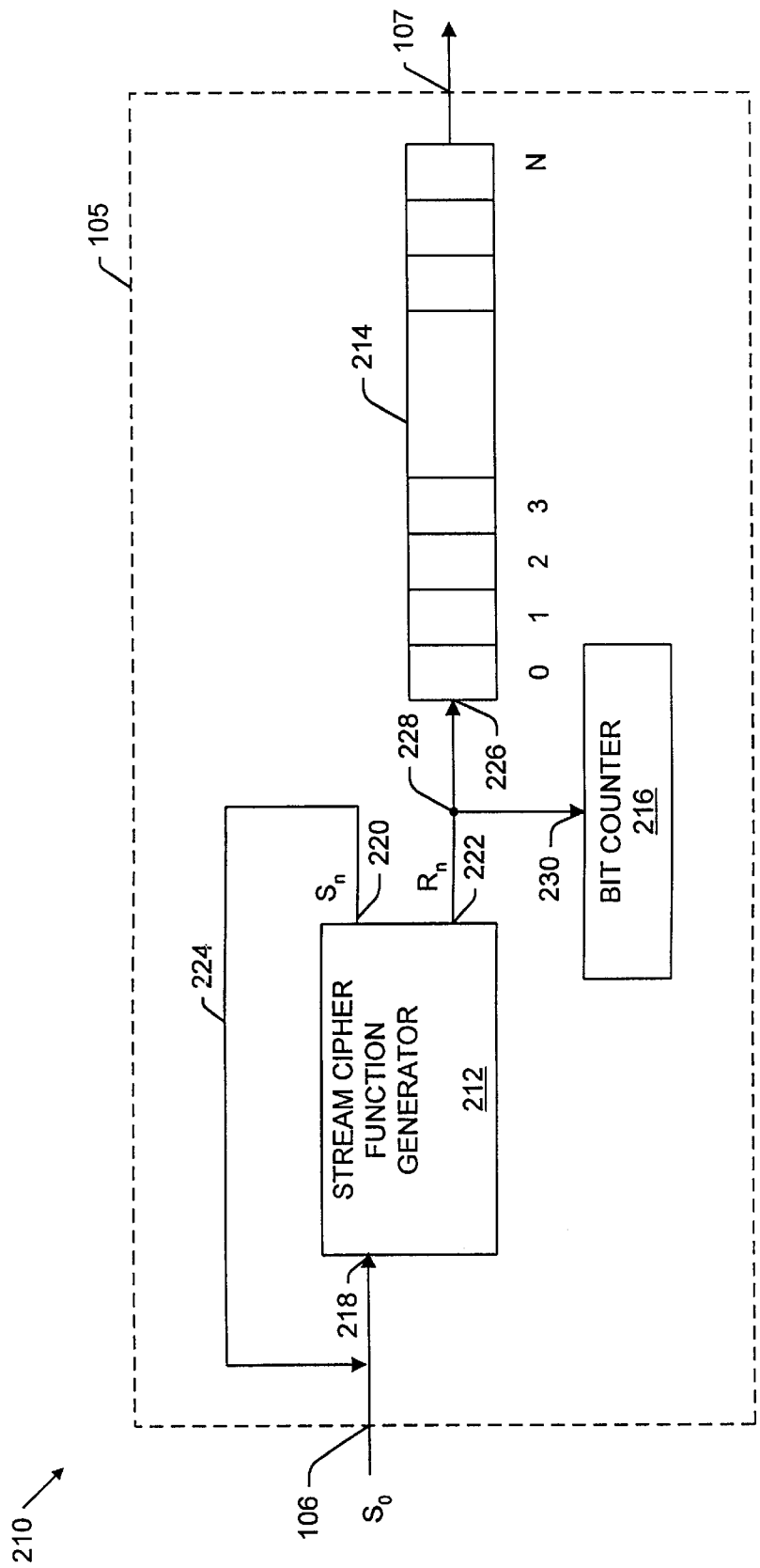
FIG. 4 is a block diagram of an embodiment of the random number generator of FIG. 1 implemented as a stream cipher function generator.

FIG. 4 illustrates at 210 a block diagram of a stream cipher random number generator including a stream cipher function generator 212, an N-bit shift register 214, and a bit counter 216. In a preferred embodiment of the present invention, N is equal to 64 and shift register 214 is a 64-bit shift register.

The stream cipher function generator 212 is coupled to receive an initial seed input value So via a seed input 218 during an initial cycle of operation. The generator generates a seed output signal, which carries a value $S_n$ at a seed output 220, and a resultant bit signal, which carries a random bit value $R_n$, at a result bit output 222. A feedback line 224 connects seed output 220 to seed input 218 to provide feedback of the seed output signal to the input 218. The shift register 214 includes an input 226 coupled to receive the random bit signal from random bit output 222 via a node 228. Bit counter 216 includes an input 230 which is also connected to node 228 to receive the resultant bit signal. Bit counter 216 is incremented by 1 after each cycle during which function generator 212 outputs seed values $S_n$ and random bit values $R_n$ via outputs 220 and 222.

During the initial cycle, stream cipher function generator 212 receives an initial N-bit seed value, $S_0$, at input 218 and generates a first N-bit seed value, $S_1$, and a first one-bit random bit value, $R_1$, at seed output 220 and result bit output 222 respectively. Bit counter 216 stores a count value which is increased each time the generator produces a one-bit random value, $R_n$. After N cycles are completed, an N-bit random number including N one-bit random values, $R_n$, is stored in shift register 214 and ready for output via output.

Figure 5:
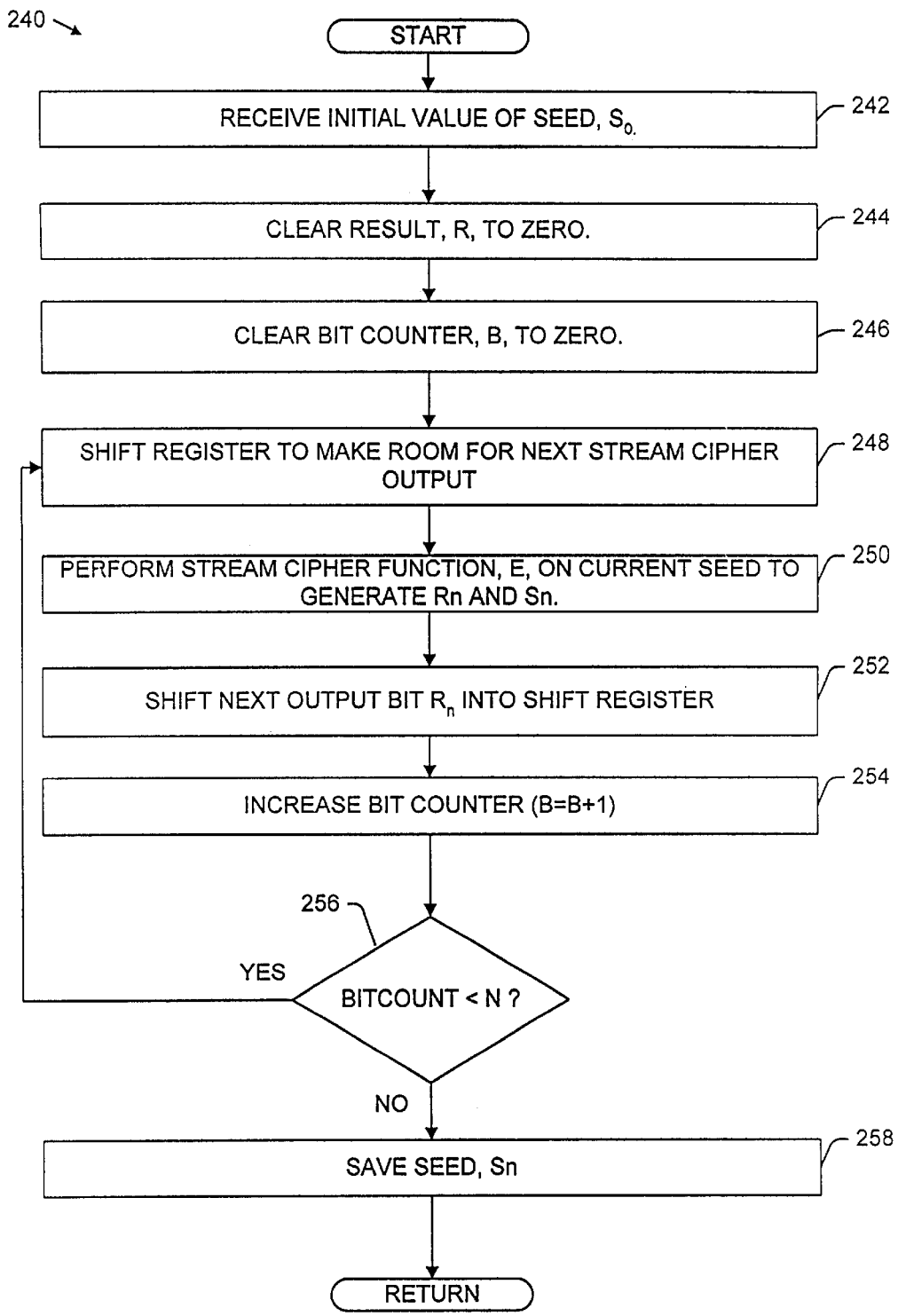
FIG. 5 is a flow diagram illustrating a process for generating random numbers using the stream cipher function generator of FIG. 4.

FIG. 5 shows a flow diagram at 240 illustrating a process according to the present invention for generating unpredictable random numbers using the stream cipher random number generator at 210 (FIG. 4). In step 242, during the initial cycle, system 210 receives the initial seed value, $S_0$, at seed input 218 of stream cipher function generator 212. In step 244 of the depicted process, the contents of shift register 214 (FIG. 4) is cleared to zero. In step 246, the contents of bit counter 216 (FIG. 1) is also cleared to zero.

In step 248, the contents of shift register 214 (FIG. 4) are shifted by 1 to make room for the next random bit value $R_n$ to be received at input 226 of the shift register from output 222 of generator 212 (FIG. 1). Note that it is not necessary to shift the contents of the shift register 214 upon the initial cycle because the shift register is already cleared to zero upon the initial cycle.

In step 250, function generator 212 performs the stream cipher function on the current seed value $S_{n-1}$ to generate a random bit value $R_n$ at output 222, and a new seed value $S_n$ at seed output 220 (FIG. 4). Upon the initial cycle, n=1 and $S_{n-1}=S_0$. In step 252, the next random bit value $R_n$ is provided from output 222 of the generator to input 226 of the shift register, and the random bit value $R_n$ is stored to the next cell of shift register 214. In step 254, the contents of bit counter 216 (FIG. 4) are increased by 1 as the bit counter detects a transfer of a bit to the shift register. In step 256, it is determined whether the contents of bit counter 216 (FIG. 4) are less than N. If so, the process proceeds back to step 248 to repeat the cycle. If the contents of bit counter 216 are equal to N, then the process proceeds to step 258 in which the new N-bit seed value is saved after which the depicted process returns.

While the cryptographically secure random number generator of the present invention has been described for use with an outcome generator of a casino gaming system, it will no doubt become apparent to those skilled in the art that the present invention may be used in any system requiring generation of random numbers.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fail within the true spirit and scope of the invention.

What I claim is:

1. A cryptographically secure random number generating system comprising:

a random number generator for generating a random number, said random number generator having a valid output set consisting of M−1 random numbers, and an invalid output set including one invalid output value;

an encryption engine responsive to said random number and to said invalid output value, and operative to encrypt said random number to provide an encrypted random number, and further operative to encrypt said invalid output value to provide an encrypted invalid output value;

means for adding, in modulo M, said invalid output value to said encrypted random number to determine a sum; and means for subtracting, in modulo M, said encrypted invalid output value from said sum to determine a cryptographically secure random number.

2. A cryptographically secure random number generating system as recited in claim 1 wherein said invalid output value of said random number generator is equal to zero.

3. A cryptographically secure random number generating system as recited in claim 1 wherein said random number generator is a stream cipher random number generator.

4. A cryptographically secure random number generating system as recited in claim 1 wherein said random number generator is a block cipher random number generator.

5. A method of generating a cryptographically secure random number, comprising the steps of:

receiving a random number output from a random number generator having a valid output set consisting of M−1 random numbers, and an invalid output set including one invalid output value;

receiving said invalid output value;

encrypting said random number using an encryption function to provide an encrypted random number;

encrypting said invalid output value using said encryption function to generate an encrypted invalid output value;

adding, in modulo M, said invalid output value to said encrypted random number to determine a sum; and subtracting, in modulo M, said encrypted invalid output value from said sum to determine a cryptographically secure random number.

6. A method of generating a cryptographically secure random number as recited in claim 5 wherein said invalid output value is equal to zero.

7. A method of generating a cryptographically secure random number as recited in claim 5 wherein said random number generator is a stream cipher random number generator.

8. A method of generating a cryptographically secure random number as recited in claim 5 wherein said random number generator is a block cipher random number generator.

9. A computer readable medium containing program instructions for generating a cryptographically secure random number, said program instructions including instructions for performing the steps comprising:

generating a random number using a random number generator having a valid output set consisting of M−1 random numbers, and an invalid output set including one invalid output value;

encrypting said random number via an encryption function to provide an encrypted random number;

encrypting said invalid output value via said encryption function to generate an encrypted invalid output value;

adding, in modulo M, said invalid output value to said encrypted random number to determine a sum; and subtracting, in modulo M, said encrypted invalid output value from said sum.

10. A computer readable medium as recited in claim 9 wherein said invalid output value is equal to zero.

11. A cryptographically secure random number generating system as recited in claim 1 wherein said invalid output value of said random number generator is randomly selected from a finite set of values.

* * * * *